(12) United States Patent
Schumacher, Jr. et al.

(10) Patent No.: US 8,409,395 B2
(45) Date of Patent: Apr. 2, 2013

(54) COMPOSITE PANEL INSERT RING AND METHOD OF USING THE SAME

(75) Inventors: Raymond L. Schumacher, Jr., Lomita, CA (US); William B. Louder, Anaheim, CA (US); Douglas E. Arnold, Costa Mesa, CA (US)

(73) Assignee: Northrop Grumman Corporation, Falls Church, VA (US)

( * ) Notice: Subject to any disclaimer, the term of this patent is extended or adjusted under 35 U.S.C. 154(b) by 311 days.

(21) Appl. No.: 12/683,714

(22) Filed: Jan. 7, 2010

(65) Prior Publication Data
US 2011/0162165 A1 Jul. 7, 2011

(51) Int. Cl.
*B29C 65/00* (2006.01)
(52) U.S. Cl. ........................................... 156/293
(58) Field of Classification Search .............. 156/91, 156/92, 293; 29/525.01–525.09
See application file for complete search history.

(56) References Cited

U.S. PATENT DOCUMENTS

| | | | |
|---|---|---|---|
| 2,967,593 A * | 1/1961 | Cushman | 52/787.1 |
| 3,137,887 A * | 6/1964 | Mannino et al. | 16/2.1 |
| 3,296,765 A | 1/1967 | Rohe et al. | |
| 3,646,981 A | 3/1972 | Barnes | |
| 4,010,519 A * | 3/1977 | Worthing | 403/404 |
| 4,623,170 A | 11/1986 | Cornwall | |
| 4,817,264 A | 4/1989 | Worthing | |
| 5,275,529 A | 1/1994 | Langenbrunner et al. | |
| 6,180,882 B1 | 1/2001 | Dinh | |
| 6,253,530 B1 * | 7/2001 | Price et al. | 52/793.1 |
| 6,868,580 B1 | 3/2005 | Diggs | |
| 6,995,316 B1 | 2/2006 | Goto | |
| 7,047,596 B2 * | 5/2006 | Sucic et al. | 16/2.1 |
| 7,195,436 B1 | 3/2007 | Stephen | |
| 2004/0119322 A1 * | 6/2004 | Dykman et al. | 296/210 |
| 2007/0236018 A1 | 10/2007 | Hussman et al. | |
| 2009/0084579 A1 | 4/2009 | Mann | |

* cited by examiner

*Primary Examiner* — Christopher Schatz
(74) *Attorney, Agent, or Firm* — Stetina Brunda Garred & Brucker

(57) ABSTRACT

Provided is a method of forming a thru-hole through a composite structure having a plurality of internal compartments. An insert ring is connected to the composite structure to create a protective layer around the periphery of a penetration formed within the composite structure. An adhesive is disposed between the composite structure and the insert ring to create a fluid-tight seal between the insert ring and the internal compartments. In this regard, the fluid-tight seal mitigates fluid flow between the internal compartments.

22 Claims, 2 Drawing Sheets

COMPOSITE PANEL INSERT RING AND METHOD OF USING THE SAME

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present disclosure is related generally to composite structures. More specifically, the present disclosure is directed toward an insert ring for a composite structure to provide a thru-hole within the composite structure and to fluidly seal internal compartments located therein.

Composite structures have been used extensively in the aerospace and marine industries. For instance, composite panels may be used to form the wing or fuselage of an aircraft, or a portion of a ship's hull or deckhouse. The composite panels are configured to provide suitable strength and stiffness, while at the same time defining a storage boundary or capacity for storage of various contents (i.e., fuel) therein.

It is understood that today's aircraft are generally complex electro-mechanical systems, which may have components formed within or extending through the composite structure. For example, a need may exist for passing electrical wiring or mechanical components from one side of the composite structure to the other side. A thru-hole may be formed within the composite structure to facilitate such passage.

Although forming the thru-hole in the composite structure allows for passage of the electrical or mechanical components, it may also compromise the strength or storage capacity of the composite structure. In particular, the fluid integrity may be compromised "externally" as well as "internally."

The "external" fluid integrity may be compromised by opening the internal compartments to the surrounding environment. As a result, the contents stored within the internal compartments may leak into the surrounding environment. This may lead to hazardous consequences in the event fuel or other hazardous materials are leaked from a storage compartment in an aircraft or ship structure into the surrounding environment.

The "internal" fluid integrity may be compromised by opening an internal compartment to an adjacent internal compartment. This may allow the contents in one internal compartment (i.e., fuel tank) to flow into an adjacent internal compartment, which may contaminant, degrade, or trap the contents of the respective internal compartments.

In view of the foregoing, there is a need in the art for a device configured to provide a protective casing around a thru-hole formed within a composite structure, while at the same time fluidly sealing the internal compartments formed within the composite structure.

BRIEF SUMMARY

There is provided a method of forming a thru-hole within a composite structure having a plurality of internal compartments. An insert ring is connected to the composite structure to create a protective layer around the periphery of a penetration formed within the composite structure. An adhesive is disposed between the composite structure and the insert ring to create a fluid-tight seal between the insert ring and the internal fluid storage compartments. In this regard, the fluid-tight seal mitigates fluid flow between the internal compartments, as well as fluid flow into the ring.

One embodiment of the method includes providing an insert ring including a male portion and a female portion. The male portion includes a male ring and a male flange extending radially outward from the male ring. The female portion includes a female ring and a female flange extending radially outward from the female ring. The female ring and male ring are cooperatively engageable to define a cylindrical extension extending through the penetration. The penetration wall is lined with adhesive or sealant, and the male portion and female portion are engaged to the structure. The male portion and/or the female portion are in compressive engagement with the structure, with the cylindrical extension being disposed within the penetration. The adhesive is disposed between the insert ring and the structure to couple the insert ring thereto and to create a fluid tight seal between the respective ones of the plurality of horizontally oriented, vertically layered internal compartments, and between the plurality of internal compartments and the insert ring.

The adhesive may be applied to the insert ring before engaging the insert ring to the structure. The adhesive may also be applied to line the penetration wall before the insert ring is engaged with the structure.

The insert ring may be engaged with the structure to dispose the male flange adjacent the first exterior surface and to dispose the female flange adjacent the second exterior surface. Adhesive may be disposed between the male flange and the first exterior surface to create a fluid tight seal between the male flange and the first exterior surface. Adhesive may also be disposed between the female flange and the second exterior surface to create a fluid tight seal between the female flange and the second exterior surface.

The male portion and the female portion may be threadably engageable with each other. Adhesive may be disposed between the male portion and the female portion to bond the male portion to the female portion and to create fluid tight seal therebetween.

Another embodiment relates to an insert for use with a composite panel for forming a thru-hole through the composite panel, wherein the composite panel includes a plurality of internal compartments and a penetration extending through the composite panel. The insert includes an insert ring including a male portion and a female portion. The male portion includes a male ring and a male flange extending radially outward from the male ring. The female portion includes a female ring and a female flange extending radially outward from the female ring. The female ring and male ring are cooperatively engageable to define a cylindrical aperture sized and configured to be disposable within the penetration.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
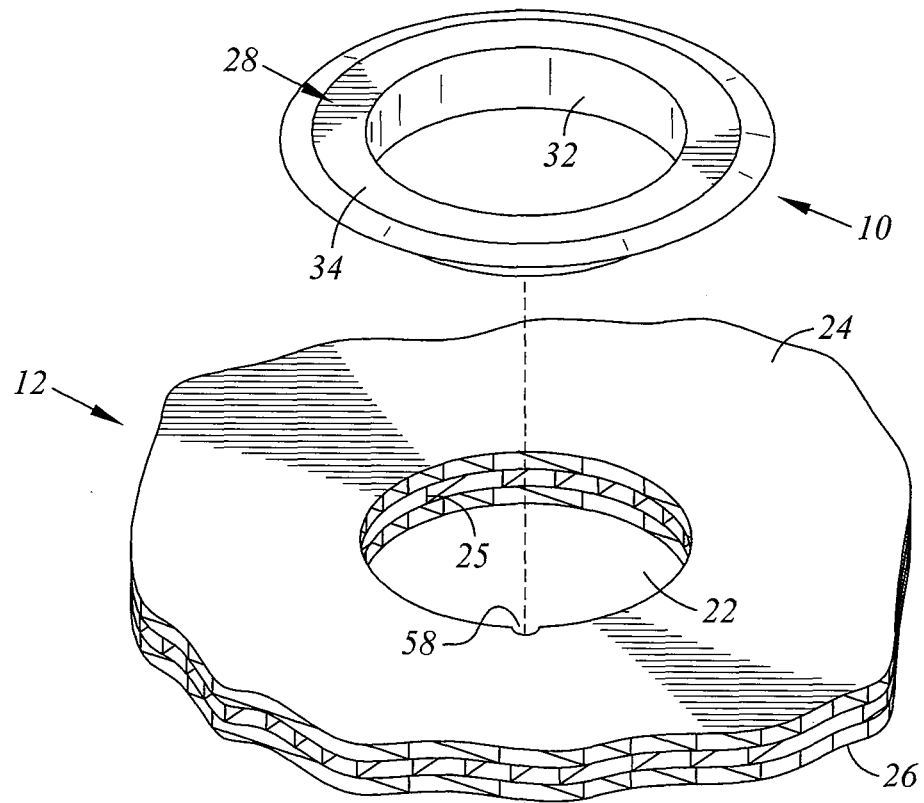
FIG. 1 is an upper perspective view of an insert ring having a male portion and a female portion configured to engage with a composite structure having multiple layers of internal compartments, the insert ring being in a detached configuration.
Figure 2:
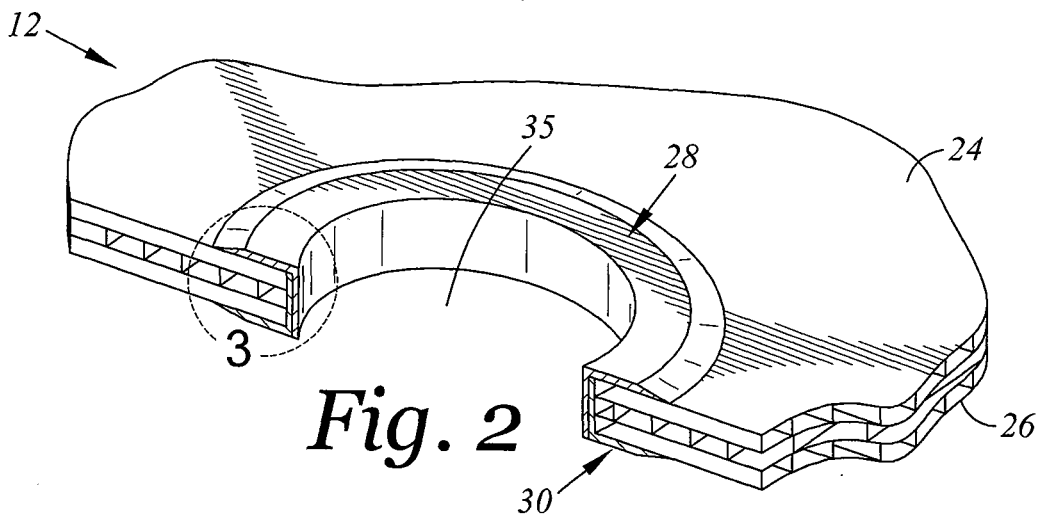
FIG. 2 is an upper perspective sectional view of the insert ring connected to the composite structure, the insert ring being in an attached configuration.
Figure 3:
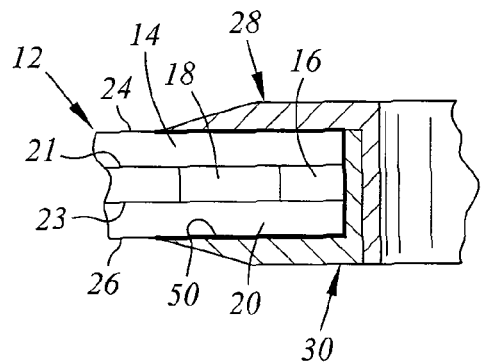
FIG. 3 is a partial, enlarged side view of the insert ring and composite structure depicted in FIG. 2.

Referring now to the drawings, wherein the showings are for purposes of illustrating an embodiment of the present disclosure, and not for purposes of limiting the same, there is shown an insert ring 10 configured for use with a composite structure 12. The composite structure 12 includes a plurality of horizontally orientated, vertically layered internal fluid storage compartments 14, 16, 18, 20 (See FIG. 3) arranged in a stacked configuration. In this regard, there are multiple levels of internal compartments 14, 16, 18, 20 separated vertically by horizontal walls 21, 23 (See FIG. 3). A penetration wall 25 (See FIG. 1) extends through the composite structure 12 to define a penetration 22 (See FIG. 1), which extends through internal compartments 14, 16 and 20. The insert ring 10 is connected to the composite structure 12 to fluidly seal internal compartments 14, 16, and 20, while also providing a protective layer around the periphery of the penetration 22.

The composite structure 12 may define a variety of sizes and shapes. For instance, the composite structure 12 may include portions of an aircraft ring or fuselage, or the hull of a marine vessel. The internal compartments 14, 16, 18, 20 located within the composite structure 12 may be used to store various contents, such as fuel, coolant water, oil, or other contents known in the art. Those skilled in the art will appreciate that the number of compartment layers may be varied without departing from the spirit and scope of the present disclosure. When the penetration 22 is formed through the composite structure 12, various internal compartments may be opened to the external environment. For instance, internal compartments 14, 16, 20 are exposed to the external environment in the composite structure 12 depicted in FIG. 3. In this regard, the contents stored within internal compartments 14, 16, and 20 may flow out of their respective compartments. Furthermore, contents within the surrounding environment may leak into the internal compartments 14, 16, 20. Accordingly, the insert ring 10 is connected to the composite structure 12 to fluidly seal internal compartments 14, 16, and 20. The insert ring 10 may be disposed in compressive fluid tight engagement with the composite structure 12.

Figure 4:
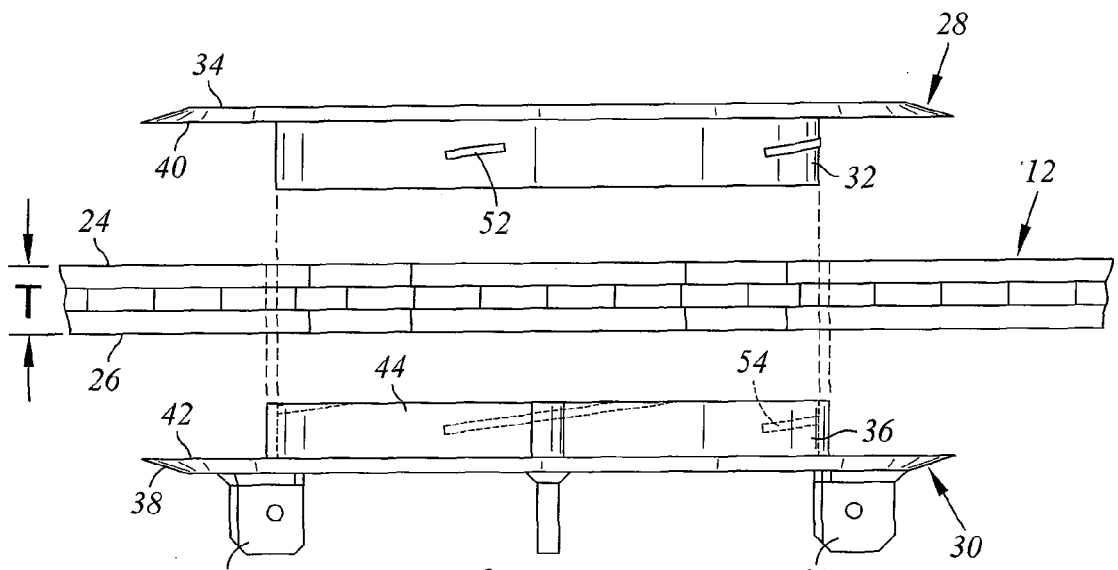
FIG. 4 is a side sectional view of the insert ring in a detached configuration.
Figure 5:
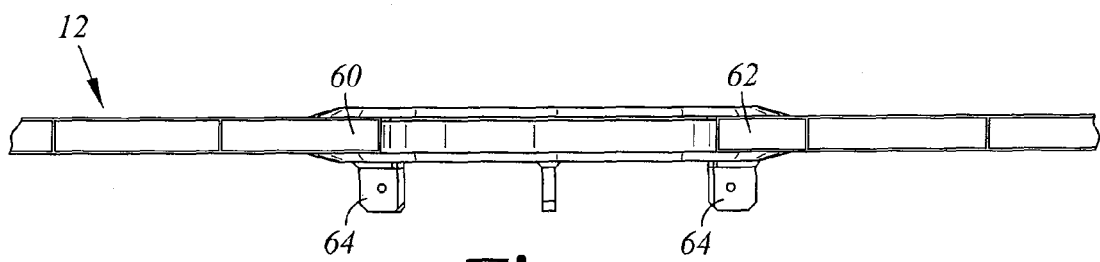
FIG. 5 is side sectional view of the insert ring connected to a composite structure having a single layer of internal compartments.

The composite structure 12 includes a first exterior surface 24 (See FIGS. 1-5) and an opposing second exterior surface 26 (See FIGS. 1-5) to define a structure thickness, "T" (See FIG. 4). The penetration wall 25 formed within the composite panel 12 extends through the thickness T, from the first exterior surface 24 to the second exterior surface 26.

The insert ring 10 includes two cooperatively engageble halves which sandwich the composite structure 12. The insert ring 10 is shown in a detached configuration in FIG. 1, and an attached configuration in FIG. 2. One embodiment of the insert ring 10 includes a male portion 28 (See FIG. 1) and a female portion 30 (See FIG. 1). The male portion 28 includes a male longitudinally extending (cylindrical) ring 32 and a male flange 34 extending radially outward from the male ring 32. The male flange 34 defines a male flange inner surface 40 (See FIG. 4) which is disposable adjacent the first exterior surface 24 when the insert ring 10 is connected to the composite structure 12. Likewise, the female portion 30 includes a female longitudinally extending (cylindrical) ring 36 and a female flange 38 extending radially outward from the female flange 36. The female flange 38 defines a female flange inner surface 42 (See FIG. 4) which is disposable adjacent the second exterior surface 26 when the insert ring 10 is coupled to the composite structure 12.

The male ring 32 and the female ring 36 are configured to be cooperatively engageable with each other to define a cylindrical aperature 35 defines a diameter which is substantially the same as the internal diameter of the penetration wall 25. (See FIGS. 1,2). In the embodiment depicted in the drawings, the male ring 32 is circumscribed by the female ring 36 when the male ring 32 is engaged to the female ring 36. In this manner, the outer diameter of the male ring 32 is slightly smaller than the inner diameter of the female ring 36 to allow for insertion of the male ring 32 into the female ring 36. When the male ring 32 is engaged with the female ring 36, the distance between the male flange inner surface 40 and the female flange inner surface 42 is slightly larger than the thickness T of the composite structure 12 to clamp the composite structure 12 between the male flange 34 and the female flange 38.

The male ring 32 and female ring 36 are preferably configured to define a length which extends at least through the penetration 22. However, it is contemplated that the male ring 32 and/or the female ring 36 may define a length which is greater than the penetration 22 to extend outside of the penetration 22, or alternatively, define a length which is less than the penetration 22. When the male ring 32 and/or female ring 36 defines a length which is less than the penetration 22, a filler material (such as adhesive, described below) may be used to fill any unwanted gaps.

Engagement between the male ring 32 and the female ring 36 may be facilitated by corresponding threads and grooves. In one embodiment, the male ring 32 includes one or more threads 52 which cooperatively engage with grooves 54 formed on the female ring 36. Engagement between the male ring 32 and the female ring 36 may be achieved by rotating the male ring 32 relative to the female ring 36 in a tightening direction without the use of a tool. As the male ring 32 continues to rotate relative to the female ring 36 in the tightening direction, the engagement is tightened. Furthermore, as the male ring 32 rotates relative to the female ring 36 in the tightening direction, the distance between the male flange 34 and the female flange 38 decreases to tighten the engagement with the composite structure 12.

Those skilled in the art will appreciate that other embodiments of the insert ring 10 may include threads formed on the female ring 36 and corresponding grooves formed on the male ring 32. Furthermore, it is contemplated that other embodiments may include male rings 32 and female rings 36 that are non-circular in shape. In this manner, the male ring 32 may engage to the female ring 36 through other engagement means, such as press-fit engagement, or other engagement means known by those skilled in the art.

The male portion 28 and/or the female portion 30 may be comprised of a nylon material and be formed by a selective laser sintering manufacturing process. In this respect, the male and female portions 28, 30 may be formed in a layerwise fashion. However, other materials and manufacturing processes known by those skilled in the art may also be used without departing from the spirit and scope of the present disclosure. For a more detailed discussion pertaining to selective laser sintering, please refer to U.S. Pat. No. 7,514,649, entitled Built-In Attachment Device Using Selective Laser Sintering, owned by Northrop Grumman Corporation, the Assignee of the present patent application.

With the basic structural components of the insert ring 10 being described above, the following discussion will now focus on a method of connecting the insert ring 10 to the composite structure 12. The composite structure 12 is provided and a penetration 22 is formed through the composite structure 12. An adhesive 50 or bonding material is disposed between the insert ring 10 and the composite structure 12 to create a fluid tight seal between the insert ring 10 and the composite structure 12, and to fluidly seal the internal fluid storage compartments 14, 16, 20 disposed adjacent the penetration 22. The adhesive 50 is preferably a composition including sealing and adhering properties, such as EA9394 paste adhesive, marketed by Henkel Corporation. The adhesive 50 should have stable properties, such as strength, through a typical temperature range of −50° F. to 220° F. It should also have good resistance to fluid degradation, specifically fuels such as JP-F or JP-8.

It is contemplated that the adhesive 50 may be disposed on the penetration wall 25 before the insert ring 10 is engaged with the composite structure 12. Alternatively, the adhesive 50 may be disposed on the insert ring 10 before the insert ring 10 is engaged with the composite structure 12. It is also contemplated that the adhesive 50 may be disposed on both the penetration wall 25 and the insert ring 10 before the insert ring 10 is engaged with the composite structure 12. In a preferred embodiment, adhesive 50 is applied to both the penetration wall 25 and the insert ring 10 to ensure squeeze-out and full sealing. The remaining adhesive will then be removed around the periphery of the insert ring 10.

In the depicted embodiment, the female ring 36 defines an outer contact surface 44 which interfaces with the penetration wall 25 of the composite structure 12. In this respect, the outer contact surface 44 defines a shape that is complementary to the shape of the penetration wall 25. Adhesive 50 or bonding material is disposed between the outer contact surface 44 to create a fluid tight engagement between the outer contact surface 44 and the penetration wall 25, as well as to fluidly seal internal compartments 14, 16 and 20.

It is also contemplated that a bonding material, sealant or adhesive 50 may be disposed between the male flange 34 and the composite structure 12, and the female flange 38 and the composite structure 12. In this manner, adhesive 50 may be applied directly to the male flange inner surface 40 or the first exterior surface 24 to create a fluid tight seal therebetween. Likewise, adhesive 50 may be disposed between the female flange inner surface 42 or the second exterior surface 26 to create a fluid tight seal therebetween. In this respect, the male ring 32 and/or the female ring 36 may be disposed in compressive fluid tight engagement with the composite structure 12.

When the insert ring 10 is engaged with the composite structure 12, the female ring 36 is inserted into the penetration 22 to dispose the outer contact surface 44 adjacent the penetration wall 25, and to dispose the female flange inner surface 42 adjacent the second exterior surface 26. The male ring 32 is also disposed within the penetration 22 to engage with the female ring 36 and to dispose the male flange inner surface 40 adjacent the first exterior surface 24, defining cylindrical aperture 35, extending between the surfaces 24, 26, through which mechanical components and/or wiring may then be passed therethrough.

As described above, one embodiment includes a male ring 32 and a female ring 36 having cooperating threads 52 and grooves 54. In the embodiment depicted in FIG. 3, the male ring 32 includes external threads 52, while the female ring 36 defines corresponding grooves 54. The male portion 28 is rotated relative to the female portion 30 to tighten the engagement between the male portion 28 and the female portion 30. Additional adhesive 50 or bonding material may be disposed between the male portion 28 and female portion 30 to further secure the male portion 28 to the female portion 30. When the insert ring 10 is fully engaged with the composite panel 12, the male portion 28 defines an inner ring surface which extends through the composite structure 12 to allow for passage of wiring, or mechanical elements through the composite structure 12. Although the inner ring surface depicted in the Figures is substantially flush with the male flange 34 and the female flange 38, it is understood that other embodiments may include an inner ring surface which extends beyond the male flange 34 and the female flange 38.

In one embodiment, it may be particularly beneficial to dispose the female portion 30 in a specific position relative to the composite structure 12. Accordingly, the female portion 30 may include a locating boss 56 (See FIG. 1) protruding from the outer contact surface 44. The composite structure 12 defines a complimentary locating notch 58 (See FIG. 1) which cooperatively engages with the locating boss 56 to properly position the female portion 30 relative to the composite structure 12.

The locating boss 56 and corresponding locating notch 58 may also facilitate the process of securing the male portion 28 to the female portion 30. In the case of threadably engageable male and female portions 28, 30, rotational movement of the male portion 28 relative to the female portion 30 is required to mate the male portion 28 to the female portion 30. However, if the composite structure 12 is relatively large (i.e., an airplane fuselage bulkhead), it may be difficult for a single person to install the insert ring 10. In particular, it may be difficult to rotate the male portion 28 with one hand, and the female portion 30 with another hand. Therefore, the engagement between the locating boss 56 and locating notch 58 may mitigate rotational movement of the female portion 30 relative to the composite structure 10. Thus, a user may connect the female portion to the composite structure 10, and then install the male portion 28 by rotating the male portion 28 relative to the female portion 30. In this manner, as the user rotates the male portion 28 relative to the female portion 30, the boss 56 and notch 58 mitigate rotation of the female portion 30, while allowing the male portion 28 to engage with the female portion 30. Thus, the boss 56 and notch 58 allows the insert ring 10 may be installed by a single person, rather than requiring multiple individuals for installation.

The composite structure 12 depicted in FIGS. 1-4 includes several layers of internal compartments formed therein. However, referring now to FIG. 5, it is contemplated that the insert ring 10 may also be used with a composite structure 12 having only one layer of internal compartments. The composite structure 12 includes internal compartments 60 and 62 disposed immediately adjacent the insert ring 10. In this embodiment, the insert ring 10 functions in substantially the same manner to fluidly seal internal compartment 60 and internal compartment 62.

It is also contemplated that several embodiments of the insert ring 10 may include one or more mounting tabs 64 (See FIGS. 4 and 5) connected to the male portion 28 or the female portion 30. The mounting tabs 64 may be used to pass electrical wiring, or to hang or mount components thereto.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of forming a thru-hole to allow wiring or mechanical components to pass through a structure having a first exterior surface, an opposing second exterior surface, a plurality of horizontally oriented, vertically layered internal fluid storage compartments disposed between the first exterior surface and the second exterior surface and a penetration wall defining an internal diameter extending through the structure between the first exterior surface and the second exterior surface to define a penetration, the method comprising the steps of:
   a) providing an insert ring including a male portion and a separate female portion, the male portion having a male ring and a male flange extending radially outward from the male ring, the female portion having a female ring and a female flange extending radially outward from the female ring, the female ring and male ring being cooperatively engageable to define a cylindrical aperture;
   b) lining the penetration wall with adhesive;
   c) locating the female portion proximate the first exterior surface, while inserting the female ring into the penetration;
   d) locating the male portion proximate the second exterior surface, while inserting the male ring into the penetration;
   e) engaging the male and female portions within the structure, the male portion and the female portion being brought into compressive engagement with the structure, such that the cylindrical aperture extends through the penetration to define the cylindrical aperture extending though the structure after the male and female portions are brought into compressive engagement, the adhesive being disposed between the insert ring and the structure to couple the insert ring thereto and to create a fluid tight seal between the plurality of internal compartments, and between the plurality of internal compartments and the insert ring; and
   f) upon completion of step e), passing wiring through the cylindrical aperture.

2. The method recited in claim 1, wherein steps b) and c) includes applying adhesive about an exterior longitudinal surface of the female ring and engaging the female ring to the structure to line the penetration wall with adhesive.

3. The method recited in claim 1, wherein step b) includes applying adhesive directly to the penetration wall.

4. The method recited in claim 1, wherein step c) includes disposing the male flange adjacent the first exterior surface and disposing the female flange adjacent the second exterior surface.

5. The method recited in claim 1, wherein step c) includes connecting the male portion to the structure such that adhesive is disposed between the male flange and the first exterior surface to create a fluid tight seal therebetween.

6. The method recited in claim 1, wherein step c) includes connecting the female portion of the structure such that adhesive is disposed between the female flange and the second exterior surface to create a fluid tight seal therebetween.

7. The method recited in claim 1, wherein step a) includes forming the insert ring via selective laser sintering.

8. The method recited in claim 1, wherein the penetration wall defines a locating notch, and wherein:
   step a) includes providing the insert ring with a locating boss extending from one of the male portion and the female portion, the locating boss being complimentary to the locating notch; and
   step c) includes connecting the insert ring to the structure, such that the locating boss is disposed within the locating notch to align the insert ring with the structure.

9. The method recited in claim 1, wherein step b) includes providing a male ring and female ring having complimentary threads and grooves, such that the threads and grooves cooperatively engage upon rotation of the male ring relative to the female ring.

10. The method recited in claim 1, wherein step c) includes connecting the male portion to the female portion to create a fluid tight seal therebetween.

11. The method recited in claim 1, further comprising the step of disposing adhesive on at least one of the male portion and the female portion.

12. The method recited in claim 1, wherein step c) includes connecting the male portion to the female portion to dispose the female ring about the male ring.

13. A method of forming a thru-hole to allow wiring or mechanical components to pass through a multilayer structure having a first exterior surface, an opposing second exterior surface, a plurality of horizontally oriented, vertically layered internal fluid storage compartments disposed between the first exterior surface and the second exterior surface, and a penetration wall defining an internal diameter extending through the structure between the first exterior surface and the second exterior surface to define a penetration, the method comprising the steps of:
   a) providing an insert ring including a male portion and a female portion, the male portion having a male ring and a male flange extending radially outward from the male ring, the female portion having a female ring and a female flange extending radially outward from the female ring, the female ring and male ring being cooperatively engageable to define a substantially cylindrical aperture extending between the first and second exterior surfaces after the male ring and female ring are engaged;
   b) lining the entire penetration wall with adhesive;
   c) separately extending the male portion and the female portion into the structure penetration, from the first and second surfaces, respectively, after the entire penetration wall is lined;
   d) engaging the male and female portions within the structure, at least one of the male portion and the female portion being in sealing compressive engagement with an adjacent and exterior structure surface, the adhesive being urged into the structure internal compartments to create a fluid tight seal between the plurality of internal compartments, and between the insert ring and the structure to couple the insert ring thereto; and
   e) upon completion step d), passing wiring through the cylindrical aperture.

14. The method recited in claim 1 wherein step b) includes lining the penetration wall with adhesive to seal each of the fluid storage compartments.

15. The method recited in claim 1 wherein step b) includes lining the penetration wall with adhesive to create a fluid tight seal between each of the fluid storage compartments.

16. The method recited in claim 15 wherein step b) includes lining the penetration wall with adhesive to create a fluid tight seal between each of the fluid storage compartments and the penetration.

17. The method recited in claim 13 wherein step b) includes lining the penetration wall with adhesive to create a fluid tight seal between each of the fluid storage compartments.

18. The method recited in claim 17 wherein step b) includes lining the penetration wall with adhesive to create a fluid tight seal between each of the fluid storage compartments and the penetration.

19. The method recited in claim 18 wherein step b) includes lining the penetration wall with adhesive to create a fluid tight seal between each of the fuel storage compartments and the penetration.

20. The method as recited in claim 1 wherein upon completion of step e) the cylindrical aperture allows wiring or mechanical components to pass therethrough.

21. The new method as recited in claim 13 wherein both the male and female portions are in sealing engagement with an adjacent exterior structure surface.

22. The method as recited in claim 21 wherein upon completion of step d) the cylindrical aperture allows wiring or mechanical components to pass therethrough.

* * * * *